US006890687B2

(12) United States Patent
Segawa et al.

(10) Patent No.: US 6,890,687 B2
(45) Date of Patent: May 10, 2005

(54) SOLID ELECTROLYTE BATTERY WITH POROUS MEMBERS BETWEEN EXPOSED CURRENT COLLECTORS AND METHOD FOR MANUFACTURING SAME

(75) Inventors: Ken Segawa, Fukushima (JP); Yasunobu Iwakoshi, Kanagawa (JP); Kazuhiro Ohba, Miyagi (JP)

(73) Assignee: Sony Corporation, Tokyo (JP)

( * ) Notice: Subject to any disclaimer, the term of this patent is extended or adjusted under 35 U.S.C. 154(b) by 346 days.

(21) Appl. No.: 10/137,070

(22) Filed: May 2, 2002

(65) Prior Publication Data

US 2003/0003365 A1 Jan. 2, 2003

(30) Foreign Application Priority Data

May 8, 2001 (JP) ..................................... P2001-137753

(51) Int. Cl.[7] .......................... H01M 4/04; H01M 4/66; H01M 2/14; H01M 2/18
(52) U.S. Cl. .......................... 429/246; 429/94; 429/300; 429/304; 29/623.5
(58) Field of Search .......................... 429/94, 246, 300, 429/304; 29/623.1, 623.5

(56) References Cited

U.S. PATENT DOCUMENTS

| | | | | |
|---|---|---|---|---|
| 4,401,736 A | * | 8/1983 | Zayatz ....................... | 429/211 |
| 4,456,664 A | * | 6/1984 | Crosbie et al. ............. | 429/104 |
| 5,631,102 A | * | 5/1997 | Spillman et al. ............. | 429/94 |
| 5,670,273 A | * | 9/1997 | Velasquez et al. .......... | 429/162 |
| 5,989,743 A | * | 11/1999 | Yamashita .................. | 429/129 |
| 6,159,253 A | | 12/2000 | Lund | |

FOREIGN PATENT DOCUMENTS

| | | | | |
|---|---|---|---|---|
| EP | 1 018 775 | | 7/2000 | |
| EP | 1104040 | * | 5/2001 | .......... H01M/10/40 |
| FR | 2 786 028 | | 5/2000 | |

* cited by examiner

*Primary Examiner*—Mark Ruthkosky
(74) *Attorney, Agent, or Firm*—Sonnenschein, Nath & Rosenthal LLP

(57) ABSTRACT

A solid electrolyte battery includes a battery element in which a cathode having a cathode composite mixture layer formed by applying a cathode composite mixture on a cathode current collector so as to provide a part to which the cathode composite mixture is not applied at an end part in the longitudinal direction of the cathode current collector and an anode having an anode composite mixture layer formed by applying an anode composite mixture on an anode current collector so as to provide a part to which the anode composite mixture is not applied at an end part in the longitudinal direction of the anode current collector are laminated so as to provide a solid electrolyte layer between the cathode and the anode. Porous members made of ceramics or non-woven fabrics are arranged between the longitudinal end parts of the cathode composite mixture layer and the longitudinal end parts of the anode composite mixture layer to extend to the parts of the cathode current collector to which the cathode composite mixture is not applied. Thus, a short-circuit in the end parts of the cathode composite mixture layer is prevented and yield upon manufacturing the solid electrolyte battery is improved.

14 Claims, 4 Drawing Sheets

SOLID ELECTROLYTE BATTERY WITH POROUS MEMBERS BETWEEN EXPOSED CURRENT COLLECTORS AND METHOD FOR MANUFACTURING SAME

RELATED APPLICATION DATA

The present application claims priority to Japanese Application(s) No(s). P2001-137753 filed May 8, 2001, which application(s) is/are incorporated herein by reference to the extent premitted by law.

BACKGROUND OF THE INVENTION

1. Field of the Invention

The present invention relates to a solid electrolyte battery having a battery element in which a cathode and an anode are laminated through a solid electrolyte and a method for manufacturing it, and more particularly to a solid electrolyte battery in which the generation of a short-circuit in the cathode is prevented.

2. Description of the Related Art

In recent years, portable electronic devices such as portable telephones or thin electronic devices such as note book type personal computers have been progressively made compact and light. In these circumstances, batteries serving as driving power sources as the electronic devices have played important roles. It has been necessary for the batteries as the driving power sources to be light and efficiently utilize accommodation spaces in the devices in order to realize the compact and light electronic devices. As such batteries, solid electrolyte batteries high in their energy density and output density, more specifically, lithium-ion batteries are most preferable.

The solid electrolyte battery has a coiling type battery element in which a cathode having a cathode composite mixture layer formed by applying a cathode composite mixture on a cathode current collector and an anode having an anode composite mixture layer formed by applying an anode composite mixture on an anode current collector are laminated through a solid electrolyte and the laminated body are coiled in the longitudinal direction, or a zigzag bending type battery element formed in such a manner that the laminated body of a cathode and an anode through a solid electrolyte are bent in a zigzag way.

In the cathode of the battery element provided in the solid electrolyte battery, the end part of the cathode composite mixture layer, that is, the end part at which the cathode composite mixture begins to be applied and the end part at which the application of the cathode composite mixture is finished are lager in their thickness of application of the cathode composite mixture than other parts. Thus, these end parts have large thickness and are brought into swelling states.

However, the swelling parts at the end parts of the cathode composite mixture layer undesirably greatly cause a short-circuit, so that yield is disadvantageously deteriorated upon manufacturing the solid electrolyte battery.

Further, even when a separator is provided between the cathode and the anode, in case the thickness of the separator is very small as low as about 15 $\mu$m or smaller, the generation rate of the short-circuit at the end parts of the cathode composite mixture layer will be inconveniently high.

SUMMARY OF THE INVENTION

The present invention is proposed by considering the above-described circumstances and it is an object of the present invention to provide a solid electrolyte battery in which yield upon manufacturing the battery is improved and a method for manufacturing the solid electrolyte battery.

In order to achieve the above-described object, according to the present invention, there is provided a solid electrolyte battery comprising a battery element in which a cathode having a cathode composite mixture layer formed by applying a cathode composite mixture on a cathode current collector so as to provide parts to which the cathode composite mixture is not applied at end parts in the longitudinal direction of the cathode current collector and an anode having an anode composite mixture layer formed by applying an anode composite mixture on an anode current collector so as to provide parts to which the anode composite mixture is not applied at end parts in the longitudinal direction of the anode current collector are laminated so as to provide a solid electrolyte layer between the cathode and the anode, wherein porous members made of ceramics or non-woven fabrics are arranged between the longitudinal end parts of the cathode composite mixture layer and the longitudinal end parts of the anode composite mixture layer to extend to the parts of the cathode current collector to which the cathode composite mixture is not applied.

In the solid electrolyte battery according to the present invention constructed as described above, since the porous members made of the ceramics or the non-woven fabrics are arranged at the end parts in the longitudinal direction of the cathode composite mixture layer, the thickness of the cathode composite mixture layer is large in the end parts of the cathode composite mixture layer. Accordingly, even when the cathode composite mixture layer swells in the end parts thereof, the generation of a short-circuit in the end parts of the cathode composite mixture layer is prevented.

Further, there is provided a method for manufacturing a solid electrolyte battery comprising: a step of applying a cathode composite mixture on a cathode current collector so as to provide parts to which the cathode composite mixture is not applied at end parts in the longitudinal direction of the cathode current collector to manufacture a cathode having a cathode composite mixture layer on the cathode current collector; a step of forming a first solid electrolyte layer on the cathode composite mixture layer; a step of manufacturing an anode having an anode composite mixture layer on an anode current collector by applying an anode composite mixture on the anode current collector so as to provide parts to which the anode composite mixture is not applied at end parts in the longitudinal direction of the anode current collector; a step of forming a second solid electrolyte layer on the anode composite mixture layer; a step of arranging porous members made of ceramics or non-woven fabrics between the longitudinal end parts of the cathode composite mixture layer and the longitudinal end parts of the anode composite mixture layer so as to extend to the end parts of the cathode current collector to which the cathode composite mixture is not applied; and a step of laminating the cathode having the first solid electrolyte layer formed on the cathode composite mixture layer and the anode having the second solid electrolyte layer formed on the anode composite mixture layer so as to interpose the first solid electrolyte layer and the second solid electrolyte layer therebetween to form a battery element.

According to the method for manufacturing the solid electrolyte battery according to the present invention constituted as described above, since the porous members made of the ceramics or the non-woven fabrics are disposed at the end parts in the longitudinal direction of the cathode composite mixture layer, the thickness of the end parts in the longitudinal direction of the cathode composite mixture layer is increased. Thus, even when the cathode composite mixture layer swells at the end parts in the longitudinal direction thereof, the generation of a short-circuit at the end parts of the cathode composite mixture layer is prevented.

BRIEF DESCRIPTION OF THE DRAWINGS

The object and other objects and advantages of the present invention will become more apparent from the following description in conjunction with the accompanying drawings in which.

DETAILED DESCRIPTION OF THE PREFERRED EMBODIMENTS

Now, a solid electrolyte battery to which the present invention is applied will be described in detail by referring to the accompanying drawings.

Figure 1:
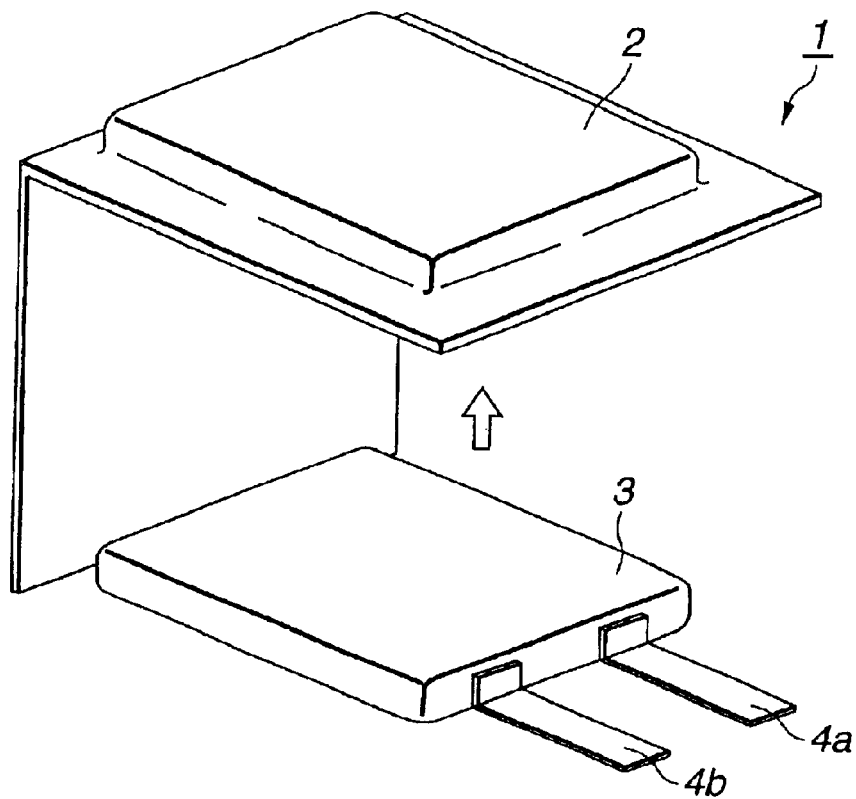
FIG. 1 is a perspective view showing a state before a battery element is accommodated in an outer package film.
Figure 2:
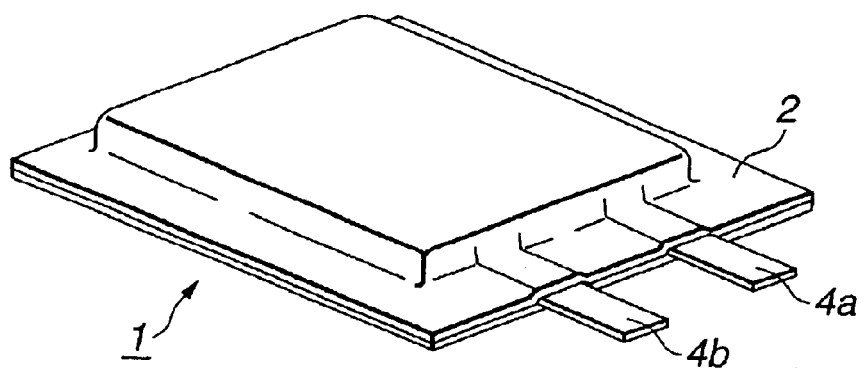
FIG. 2 is a perspective view of a solid electrolyte battery.

A solid electrolyte battery 1 is a so-called polymer lithium-ion secondary battery. As shown in FIGS. 1 and 2, a battery element 3 is contained in an outer package film 2 formed by sandwiching an aluminum foil in between polyolefine films. In the solid electrolyte battery 1, the peripheral edge part of the outer package film 2 is formed as a heat sealing part. This heat sealing part is heat-sealed to pack the battery element 3 under vacuum.

Further, in the solid electrolyte battery 1, a cathode terminal 4a and an anode terminal 4b (referred them together as to an electrode terminal 4, hereinafter) respectively attached to the cathode and the anode of the battery element 3 are drawn outside the outer package film 2.

The above-described electrode terminal 4 is attached to the battery element 3 by, for instance, a resistance welding method, an ultrasonic welding method or the like. The battery element 4 is pulled out from the outer package film 2, as shown in FIG. 1. At that time, resin pieces are provided at parts where the electrode terminal 4 comes into contact with the outer package film 2.

As the outer package film 2, any moisture-proof film may be employed. For example, a film formed by bonding together a nylon film, an aluminum foil and polyethylene film in regular order may be used as well as the film having the above-described structure.

When the battery element 3 is accommodated in the outer package film 2, a substantially central part of one sheet type film is bent so that the battery element 3 is held inside the film, however, the film may not be limited to such a structure. For instance, the battery may be sandwiched in between two films including an upper film and a lower film or the battery element may be sealed in a film formed in a bag.

As an outer package material for accommodating the battery element 3, although the outer package film 2 made of an aluminum laminate film which is preferable in view of thickness, weight and cost, it is to be understood that the present invention is not limited thereto, a prismatic or a cylindrical metallic can may be employed as the outer package material.

Figure 3:
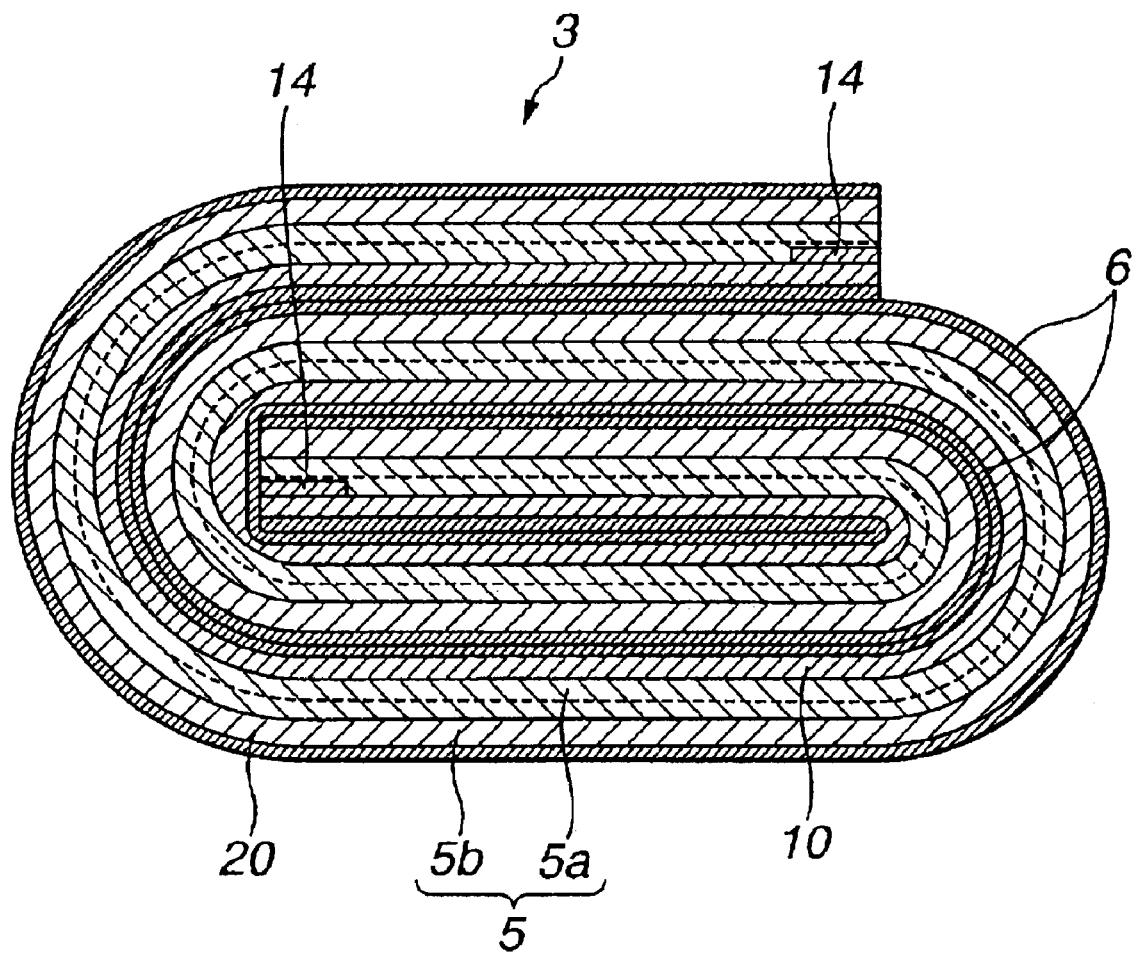
FIG. 3 is a sectional view of a coiling type battery element.

The battery element 3 is a so-called coiling type battery element 3, as shown in FIG. 3, in which an elongated cathode 10 and an elongated anode 20 are laminated through a solid electrolyte layer 5 in such a manner that the cathode is longitudinally coiled so as to be located in an inner peripheral side. On the surfaces of the cathode 10 and the anode 20 which do not come into contact with the solid electrolyte layer 5, a separator 6 is disposed to assuredly maintain the safety of the solid electrolyte battery 1.

Figure 4:
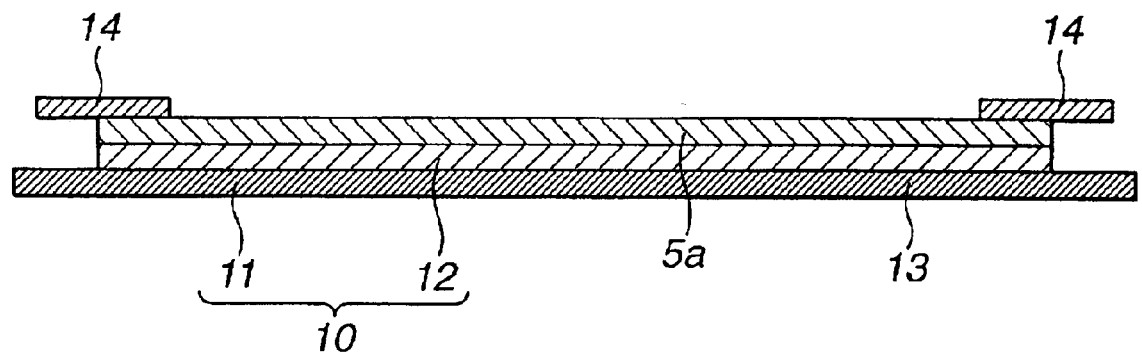
FIG. 4 is a sectional view of a cathode.

As shown in FIG. 4, the cathode 10 includes a cathode current collector 11 and a cathode composite mixture layer 12 formed by applying a cathode composite mixture on the cathode current collector 11. Further, at the end parts of the cathode current collector 11, are provided parts 13 to which the cathode composite mixture is not applied to collect electric current from the cathode 10. On the cathode composite mixture layer 12, a first solid electrolyte layer 5a is formed.

As the cathode current collector 11, for example, a metallic foil such as an aluminum foil can be used. As a cathode active material, there may be employed lithium-containing transition metal oxides. Specifically, $LiCoO_2$, $LiNiO_2$, $LiMn_2O_4$, $LiNi_xCo_{1-x}O_2$ (here, x satisfies a relation expressed by 0<x<1). Further, in the cathode composite mixture layer 12, conventionally well-known binding agents or conductive agents may be included.

Figure 5:
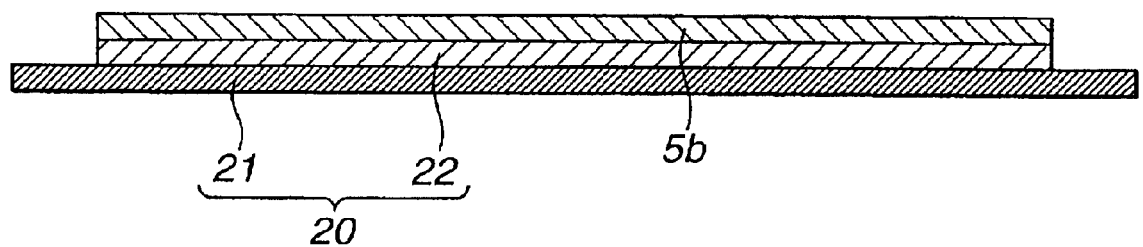
FIG. 5 is a sectional view of an anode.

As shown in FIG. 5, the anode 20 includes an anode current collector 21 and an anode composite mixture layer 22 formed by applying an anode composite mixture on the anode current collector 21. On the anode composite mixture layer 22, a second solid electrolyte layer 5b is formed.

As the anode current collector 21, for instance, a metallic foil such as a copper foil can be used. As an anode active material, may be employed materials capable of doping and/or dedoping lithium. Specifically, carbon materials can be employed. Further, in the anode composite mixture layer 22, conventionally well-known binding agents or conductive agents may be included.

In the structure of the battery element 3, the solid electrolyte layer 5 is formed in a unitary layer by sticking the first solid electrolyte layer 5a formed on the cathode composite mixture layer 12 to the second electrolyte layer 5b formed on the anode composite mixture layer 22.

In the solid electrolyte battery 1, as shown in FIGS. 3 and 4, porous members made of ceramics or non-woven fabrics 14 are arranged between end parts in the longitudinal direction of the cathode composite mixture layer 12 and end parts in the longitudinal direction of the anode composite mixture layer 22 so as to be extended to the parts 13 of the cathode current collector 11 to which the cathode composite mixture is not applied.

The longitudinal end parts of the cathode composite mixture layer 12, that is, the end part at which the cathode composite mixture begins to be applied and the end part at which the application of the cathode composite mixture is finished have the thickness of application of the cathode composite mixture larger than that of other parts, so that the end parts of the cathode composite mixture layer are large in their thickness and swell. Therefore, in a conventional solid electrolyte battery, a short-circuit due to the swelling in the end parts of the cathode composite mixture layer has been inconveniently generated so that yield upon manufacturing the solid electrolyte battery has been lowered.

On the contrary, according to the solid electrolyte battery 1 to which the present invention is applied, since the porous members made of the ceramics or the non-woven fabrics 14 are arranged between the end parts in the longitudinal direction of the cathode composite mixture layer 12 and the end parts in the longitudinal direction of the anode composite mixture layer 22 so as to extend to the parts 13 of the cathode current collector 11 to which the cathode composite mixture is not applied, even when the cathode composite mixture layer 12 has large thickness in the end parts thereof and swells in the end parts thereof, the short-circuit in the end parts of the cathode composite mixture layer 12 is prevented. Accordingly, in the solid electrolyte battery 1, the generation of the short-circuit is prevented and yield upon manufacturing the solid electrolyte battery is improved.

Further, in the solid electrolyte battery 1, the porous members made of the ceramics or the non-woven fabrics 14 are arranged between the end parts in the longitudinal direction of the cathode composite mixture layer 12 and the end parts in the longitudinal direction of the anode composite mixture layer 22 so as to extend to the parts 13 of the cathode current collector 11 to which the cathode composite mixture is not applied so that a battery capacity is sufficiently exhibited to have a high capacity.

For instance, when polypropylene tapes or the like are arranged between the end parts in the longitudinal direction of the cathode composite mixture layer 12 and the end parts in the longitudinal direction of the anode composite mixture layer 22 so as to extend to the parts 13 of the cathode current collector 11 to which the cathode composite mixture is not applied, since the polypropylene tapes do not pass lithium ions therethrough, the cathode active materials covered with the polypropylene tapes cannot contribute to a battery reaction. Therefore, the theoretical capacity of the battery cannot be completely taken out.

As compared with the polypropylene tapes, the porous members made of the ceramics or the non-woven fabrics 14 have the same functions as those of so-called separators by which the cathode 10 is insulated from the anode 20. Accordingly, even when the porous members made of the ceramics or the non-woven fabrics 14 are arranged on the cathode composite mixture layer 12, the utilization factor of the cathode active materials is not lowered.

Further, when the solid electrolyte battery 1 is overcharged so that its temperature becomes high, there is not any fear that the porous members made of the ceramics or the non-woven fabrics 14 may be possibly deformed like the separators made of, for instance, polyethylene, polypropylene or the like. Consequently, the generation of the short-circuit can be assuredly prevented. Accordingly, the porous members made of the ceramics or the non-woven fabrics 14 are disposed between the end parts in the longitudinal direction of the cathode composite mixture layer 12 and the end parts in the longitudinal direction of the anode composite mixture layer 22 so as to extend toward the parts 13 of the cathode current collector 11 to which the cathode composite mixture is not applied, so that the solid electrolyte battery 1 is excellent in its safety.

Here, assuming that the major axis of the coiling type battery element 3 is A, the width of the porous member made of the ceramics or the non-woven fabric 14 parallel to the longitudinal direction of the cathode 10 (refer it to as the breadth of the porous member made of the ceramics or the non-woven fabric 14, hereinafter) is preferably 1/10 times as wide as A, or A or smaller. When the breadth of the porous member made of the ceramics or the non-woven fabric 14 is smaller than A/10, there arises a fear that the end parts of the cathode composite mixture layer 12 and the first solid electrolyte layer 5a cannot be completely covered with the porous members or the non-woven fabrics 14. On the other hand, when the breadth of the porous member made of the ceramics or the non-woven fabric 14 exceeds the breadth A, the thickness of the solid electrolyte battery 1 increases and the volume of the battery element 3 itself increases, so that the energy density of the solid electrolyte battery 1 may be possibly deteriorated. Therefore, when the breadth of the porous member made of the ceramics or the non-woven fabric 14 is A/10 or larger and A or smaller, the short-circuit in the end parts of the cathode composite mixture layer 12 is assuredly prevented and the solid electrolyte battery 1 having a high capacity can be obtained.

Additionally, the porous member made of the ceramics or the non-woven fabric 14 may preferably have the thickness of 0.01 mm or larger and 0.05 mm or smaller. When the thickness of the porous member made of the ceramics or the non-woven fabric 14 is smaller than 0.01 mm, there arises a fear that the thickness may be hardly uniform, especially, a short-circuit may be liable to be generated in thin parts. On the other hand, when the thickness of the porous member made of the ceramics or the non-woven fabric 14 exceeds 0.05 mm, the volume occupied by the porous members made of the ceramics or the non-woven fabrics 14 in the solid electrolyte battery 1 becomes large and the volume occupied by the cathode 10 and the anode 20 which contributes to the battery reaction decreases. Therefore, there exists a fear that a desired battery capacity cannot be achieved.

As the porous member made of the ceramics or the non-woven fabric 14, alumina may be desirably employed.

The solid electrolyte layer 5, that is, the first solid electrolyte layer 5a and the second solid electrolyte layer 5b are respectively formed on the cathode composite mixture layer 12 and the anode composite mixture layer 22. As the solid electrolyte layer 5, there may be employed any of a complete solid electrolyte composed of electrolyte salt and a polymer matrix and a solid gel electrolyte composed of electrolyte salt, a polymer matrix and a nonaqueous solvent.

As the electrolyte salts, there may be utilized lithium salts, for instance, $LiCl$, $LiBr$, $LiClO_4$, $LiPF_6$, $LiBF_4$, $LiAsF_6$, $LiB(C_6H_5)_4$, $Li(CH_3SO_3)$, $LiCF_3SO_3$, etc.

As the polymer matrixes, there may be used, for example, polyacrylonitrile, polyvinylidene fluoride, polytetrafluoro ethylene, polyhexafluoro propylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, polycarbonate, etc.

As the nonaqueous solvents, there may be utilized nonaqueous solvents such as ethylene carbonate, propylene carbonate, butylene carbonate, vinylene carbonate, γ-butyrolactone, γ-valerolactone, diethoxyethane, tetrahydrofuran, 2-methyl tetrahydrofuran, 1,3-dioxane, methyl acetate, methyl propionate, dimethyl carbonate, diethyl carbonate, ethyl methyl carbonate. As a lubricating solvent, one kind of solvent of these nonaqueous solvents may be independently used or two or more kinds of solvents may be mixed and the mixture may be used.

As the separators 6, there may be employed microporous polyolefine films such as polyethylene films, polypropylene films and the like, woven fabrics made of fibers such as glass fibers, fibers composed of polyimide, polyamide, cellulose, etc. and non-woven fabrics and so on. The thickness of the separator may preferably range from 8 $\mu$m to 15 $\mu$m.

In the battery element 3, the cathode 10 and the anode 20 are insulated from each other by the solid electrolyte layer 5 formed by bonding the first electrolyte layer 5a formed on the cathode composite mixture layer 12 to the second electrolyte layer 5b formed on the anode composite mixture layer 22. Therefore, although the battery element 3 does not need, what is called, a separator between the cathode composite mixture layer 12 and the anode composite mixture layer 22, it is to be understood that the present invention is not limited thereto and the separator may be interposed therebetween to more improve a safety.

In order to manufacture the solid electrolyte battery 1 constructed as mentioned above, a step for manufacturing the cathode 10 having the cathode composite mixture layer 12 and the cathode current collector 11 is firstly carried out. This step is a step for applying the cathode composite mixture to the cathode current collector 11 so as to provide the parts 13 to which the cathode composite mixture is not applied at the end parts in the longitudinal direction of the cathode current collector 11 to form the cathode 10 having the cathode composite mixture layer 12 on the cathode current collector 11.

Then, a step for forming the first solid electrolyte layer 5a on the cathode composite mixture layer 12 is performed.

After that, a step for manufacturing the anode 20 including the anode composite mixture layer 22 and the anode current collector 21 is carried out. This step is a step for applying the anode composite mixture on the anode current collector 21 so as to provide the end parts to which the anode composite mixture is not applied at the end parts in the longitudinal direction of the anode current collector 21 to form the anode 20 having the anode composite mixture layer 22 on the anode current collector 21.

Then, a step for forming the second solid electrolyte layer 5b on the anode composite mixture layer 22 is performed.

After that, a step for arranging the porous members made of ceramics or the non-woven fabrics 14 is carried out. This step serves as a step for arranging the porous members made of ceramics or the non-woven fabrics 14 between the longitudinal end parts of the cathode composite mixture layer 12 and the longitudinal end parts of the anode composite mixture layer 22 so as to extend toward the parts 13 of the cathode current collector 11 to which the cathode composite mixture is not applied.

Subsequently, a step for forming the battery element 3 is performed. This step serves as a step for laminating the cathode 10 having the first solid electrolyte layer 5a on the cathode composite mixture layer 12 and the anode 20 having the second solid electrolyte layer 5b formed on the anode composite mixture layer 22 so as to interpose the first solid electrolyte layer 5a and the second solid electrolyte layer 5b between the cathode 10 and the anode 20 to constitute the battery element 3.

Further, a step for longitudinally coiling the battery element 3 to form a coiling type battery element 3 and accommodating the battery element 3 thus obtained in the outer package film 2.

According to a method for manufacturing the solid electrolyte battery 1 constructed as mentioned above, since the porous members made of the ceramics or the non-woven fabrics 14 are disposed at the end parts in the longitudinal direction of the cathode composite mixture layer 12, even when the thickness in the longitudinal end parts of the cathode composite mixture layer 12 is large and the end parts swell, the generation of short-circuit in the end parts of the cathode composite mixture layer 12 can be prevented. Therefore, according to the method for manufacturing the solid electrolyte battery 1, there can be manufactured the solid electrolyte battery 1 in which yield upon manufacture of the battery is improved.

Figure 6:
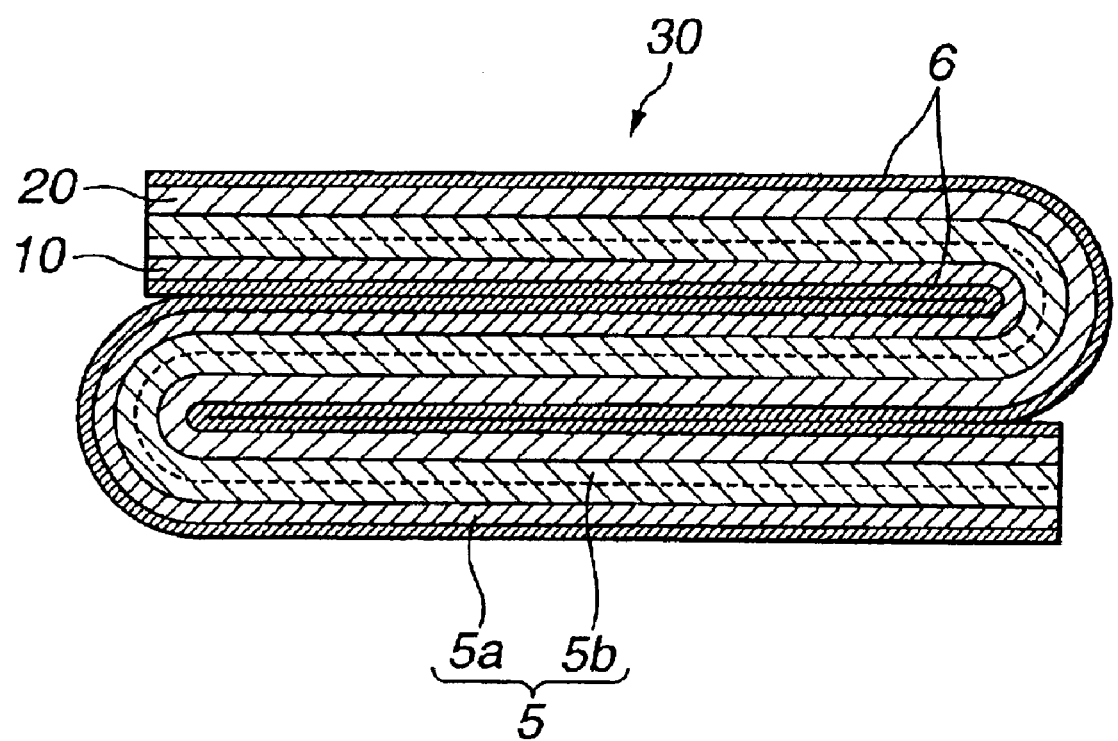
FIG. 6 is a sectional view of a zigzag bending type battery element.

In the above explanation, although the solid electrolyte battery 1 having the coiling type battery element 3 is described, it is to be understood that the present invention is not limited thereto, and there may be employed as shown in FIG. 6, a zigzag bending type battery element 30 in which an elongated cathode 10 and an elongated anode 20 are laminated through a solid electrolyte layer 5 and the laminated body is bent in a zigzag manner, as a battery element.

A solid electrolyte battery having the zigzag bending type battery element 30 has the same structure as that of the above-described solid electrolyte battery 1 except that the form of the battery element is different from that of the battery element of the above-described solid electrolyte battery 1. Therefore, the same members as those of the above-described solid electrolyte battery 1 are designated by the same reference numerals and the explanation thereof will be omitted.

In the solid electrolyte battery having the zigzag bending type battery element 30, porous members made of ceramics or non-woven fabrics 14 are arranged between end parts in the longitudinal direction of a cathode composite mixture layer 12 and end parts in the longitudinal direction of an anode composite mixture layer 22 so as to extend toward parts 13 of a cathode current collector 11 to which a cathode composite mixture is not applied like the solid electrolyte battery 1 having the coiling type battery element 3, even when the cathode composite mixture layer 12 is large in thickness of the end parts and swells in the end parts, a short-circuit is prevented at the end parts of the cathode composite mixture layer 12. Therefore, in this solid electrolyte battery, there is no fear of short-circuit and yield upon manufacturing the solid electrolyte battery is improved.

Assuming that the bent width of the zigzag bending type battery element 30 is B, the breadth of the porous member made of ceramics or the non-woven fabric 14 may be preferably 1/10 times as wide as B and B or smaller. When the breadth of the porous member made of the ceramics or the non-woven fabric 14 is smaller than B/10, there arises a fear that the end parts of the cathode composite mixture layer 12 and the solid electrolyte layer 5a cannot be completely covered therewith. On the other band, when the breadth of the porous member made of the ceramics or non-woven fabric 14 is B or larger, since the thickness of the solid electrolyte battery increases and the volume of the battery element 30 itself increases, there exists a fear that the energy density of the solid electrolyte battery is deteriorated. Accordingly, the breadth of each porous member made of the ceramics or each non-woven fabric 14 is preset to B/10 or larger and B or smaller so that the short-circuit in the end parts of the cathode composite mixture layer 12 can be assuredly prevented and a solid electrolyte battery having a high capacity can be obtained.

EXAMPLES

Now, solid electrolyte batteries to which the present invention is applied will be described in detail on the basis of specific experimental results.

Sample 1

[Method for Manufacturing Cathode]

LiCoO$_2$ of 91 parts by weight as a cathode active material, carbon black of 6 parts by weight as a conductive agent and polyvinylidene fluoride of 3 parts by weight as a binding agent were mixed together to prepare a cathode composite mixture and the obtained mixture was dispersed in N-methyl-2-pyrrolidone to have a slurry cathode composite mixture.

Then, the slurry cathode composite mixture was uniformly applied to both the surfaces of a cathode current collector having the thickness of 20 μm so as to provide parts to which the cathode composite mixture is not applied at end parts in the longitudinal direction of the cathode current collector. The applied cathode composite mixture was dried and the cathode current collector with the composite mixture thus dried was compression-molded by a roll press machine to obtain a cathode having a cathode composite mixture layer.

[Method for Manufacturing Anode]

Initially, graphite of 90 parts by weight as an anode active material was mixed with polyvinylidene fluoride of 10 parts by weight as a binding agent to prepare an anode composite mixture. Then, this mixture was dispersed in N-methyl-2-pyrrolidone to have a slurry anode composite mixture.

Then, the slurry anode composite mixture was uniformly applied to both the surfaces of an anode current collector having the thickness of 15 μm so as to provide parts to which the anode composite mixture was not applied at end parts in the longitudinal direction of the anode current collector. Then, the applied anode composite mixture was dried and the anode current collector with the anode composite mixture thus dried was compression-molded by a roll press machine to obtain an anode having an anode composite mixture layer.

[Method for Preparing Gel Electrolyte Solution]

Ethylene carbonate of 42.5 parts by weight, propylene carbonate of 42.5 parts by weight and $LiPF_6$ of 15 parts by weight as electrolyte salt were mixed together to prepare a plasticizer. Then, the plasticizer of 30 parts by weight, polyvinylidene fluoride-co-hexafluoro propylene (the content of hexafluoro propylene is 7 wt %) of 10 parts by weight and diethyl carbonate of 60 parts by weight were uniformly mixed together to prepare gel electrolyte solution.

The gel electrolyte solution was uniformly applied to the cathode composite mixture layer of the cathode and the anode composite mixture layer of the anode manufactured as described above to impregnate the cathode composite mixture layer and the anode composite mixture layer with the gel electrolyte solution. Then, the cathode having the cathode composite mixture layer and the anode having the anode composite mixture layer to which the gel electrolyte solution was applied was left for 8 hours at ambient temperature to vaporize and remove dimethyl carbonate. Thus, the cathode and the anode having the gel electrolytes were obtained.

Then, the cathode and the anode having the gel electrolytes were formed as a unitary member through a separator to obtain a laminated structure in which the cathode, the gel electrolyte, the separator, the gel electrolyte and the anode were sequentially laminated. Further, the obtained laminated structure was longitudinally coiled to manufacture a coiling type battery element. Then, this battery element was housed in a laminate film with a three-layer structure including polypropylene, aluminum and nylon and packed under vacuum to obtain a gel electrolyte battery. Here, the major axis (refer it to as A, hereinafter) of the coiling type battery element was 34 mm.

Sample 2

A gel electrolyte battery was manufactured in the same manner as that of the sample 1 except that polypropylene tapes were arranged between end parts in the longitudinal direction of a cathode composite mixture layer and end parts in the longitudinal direction of an anode composite mixture layer so as to extend toward parts of a cathode current collector to which a cathode composite mixture is not applied.

Samples 3 to 5

A gel electrolyte battery was manufactured in the same manner as that of the sample 1 except that when a cathode was manufactured, alumina non-woven fabrics having the thickness and breadth shown in Table 1 were arranged between end parts in the longitudinal direction of a cathode composite mixture layer and end parts in the longitudinal direction of an anode composite mixture layer to extend toward parts of a cathode current collector to which a cathode composite mixture was not applied.

Charging and discharging tests as described below were carried out for the samples 1 to 5 manufactured as mentioned above to measure 0.2 C capacity, a battery capacity (unit: Wh/l) and the percentage of internal short-circuit (unit: %) and evaluate battery characteristics.

[Charging and Discharging Test]

Firstly, as the initial charging operation for a battery, a constant-current and constant-voltage charging operation of 500 mA was carried out for 3 hours under the condition of upper limit voltage of 4.2 V. Then, a constant-current discharging operation of 100 mA was carried out until the finish voltage reached 3.0 V to measure 0.2 C capacity. The theoretical capacity of each gel electrolyte battery is 500 mAh.

Then, the battery capacity was obtained by carrying out a calculation of the 0.2 C capacity measured as described above×voltage/volume.

After that, assuming that the number of samples is 100, the percentage of internal short-circuit was obtained on the basis of the number of the gel electrolyte batteries in which the short-circuit was generated relative to the 100 gel electrolyte batteries. As the decision standard of the internal short-circuit, each sample was stored while it was charged to 4.2 V and when the battery voltage of the sample was lowered to 4.1 V or lower after one week, the state of the sample was considered to be a short-circuit generation state.

The above described measured results are shown in Table 1 as well as the thickness of the batteries and so on.

TABLE 1

| | Porous Member/ Non-woven Fabric | | |
| --- | --- | --- | --- |
| | Breadth | Thickness (mm) | Thickness of Battery (mm) |
| Sample 1 | — | — | 3.72 |
| Sample 2 | 0.1A | 0.07 | 3.49 |
| Sample 3 | 1A | 0.02 | 3.73 |
| Sample 4 | 1A | 0.05 | 3.79 |
| Sample 5 | 1A | 0.10 | 3.89 |

| | 0.2 C Capacity (mAh) | Battery Capacity (Wh/l) | Percentage of Internal Short-circuit (%) |
| --- | --- | --- | --- |
| Sample 1 | 500 | 229 | 4 |
| Sample 2 | 480 | 216 | 0 |
| Sample 3 | 500 | 229 | 0 |
| Sample 4 | 500 | 225 | 0 |
| Sample 5 | 500 | 219 | 0 |

It is understood from the Table 1 that the generation of an internal short-circuit is prevented in the samples 3 to 5 in which the alumina separators are arranged between the end parts in the longitudinal direction of the cathode composite mixture layer and the end parts in the longitudinal direction of the anode composite mixture layer so as to be extended toward the parts of the cathode current collector to which the cathode composite mixture is not applied. Further, it is also understood that the samples 3 to 5 respectively have good 0.2 C capacity and battery capacity.

On the contrary, it is understood that an internal short-circuit is generated in the sample 1 in which the alumina separators are not disposed between the end parts in the longitudinal direction of the cathode composite mixture layer and the end parts in the longitudinal direction of the anode composite mixture layer, and accordingly, the sample 1 is not preferable in its practical use.

Still further, it is understood that the generation of an internal short-circuit is prevented in the sample 2 in which the polypropylene tapes are arranged between the end parts in the longitudinal direction of the cathode composite mixture layer and the end parts in the longitudinal direction of the anode composite mixture layer so as to be extended to the parts of the cathode current collector to which the cathode composite mixture is not applied, however, the 0.2 C capacity and battery capacity of the sample 2 are deteriorated.

Accordingly, the alumina separators are disposed between the longitudinal end parts of the cathode composite mixture layer and the longitudinal end parts of the anode composite mixture layer to be extended toward the parts of the cathode current collector to which the cathode composite mixture is not applied, so that the gel electrolyte battery with high capacity in which the short-circuit is not generated and the battery capacity is completely taken out can be apparently obtained.

Subsequently, a plurality of gel electrolyte batteries having alumina separators with prescribed thickness and different breadth were manufactured.

Samples 6 to 9

Each gel electrolyte battery was manufactured in the same manner as that of the sample 1 except that when a cathode was manufactured, alumina separators with breadth shown in Table 2 were arranged between end parts in the longitudinal direction of a cathode composite mixture layer and end parts in the longitudinal direction of an anode composite mixture layer to extend toward the parts of a cathode current collector to which a cathode composite mixture was not applied.

The charging and discharging tests as described above were similarly carried out for the samples 6 to 9 manufactured as mentioned above to measure 0.2 C capacity, a battery capacity (unit: Wh/l) and the percentage of internal short-circuit (unit: %) respectively. Assuming that the number of the samples is 100, the percentage of an internal short-circuit was obtained on the basis of the number of the gel electrolyte batteries in which the short-circuits were generated relative to the gel electrolyte batteries of 100 pieces. The theoretical capacity of each gel electrolyte battery is 500 mAh. These measured results are shown in the Table 2 as well as the thickness of batteries and so on.

TABLE 2

| | Porous Member/ Non-woven Fabric | | Thickness of Battery (mm) | 0.2 C Capacity (mAh) | Battery Capacity (Wh/l) | Percentage of Internal Short-circuit (%) |
|---|---|---|---|---|---|---|
| | Breadth | Thickness (mm) | | | | |
| Sample 6 | 0.01 A | 0.03 | 3.75 | 500 | 227 | 1 |
| Sample 7 | 0.1 A | 0.03 | 3.75 | 500 | 227 | 0 |
| Sample 8 | 1 A | 0.03 | 3.75 | 500 | 227 | 0 |
| Sample 9 | 1.5 A | 0.03 | 3.83 | 500 | 223 | 0 |

When the sample 6 in which the breadth of the alumina non-woven fabric is 0.01A is compared with the sample 7 in which the breadth of the non-woven fabric is 0.1A, it is recognized that the internal short-circuit is prevented in the sample 7, however, the internal short-circuit is generated in the sample 6.

Further, when the sample 8 in which the breadth of the alumina non-woven fabric is 1A with the sample 9 in which the breadth of the alumina non-woven fabric is 1.5A, it can be recognized that the battery capacity of the sample 9 is lower than that of the sample 8.

Accordingly, assuming that the major axis of the battery element is A in the gel electrolyte battery having the coiling type battery element, the breadth of the alumina non-woven fabric is 0.1A or larger and 1A or smaller, so that the short-circuit in the end parts of the cathode composite mixture layer can be assuredly prevented and the gel electrolyte battery with high capacity can be apparently obtained.

As apparent from the above description, according to the solid electrolyte battery and the method for manufacturing it, since the porous members made of ceramics or the non-woven fabrics are arranged between the end parts in the longitudinal direction of the cathode composite mixture layer and the end parts in the longitudinal direction of the anode composite mixture layer so as to be extended to the parts of the cathode current collector to which the cathode composite mixture is not applied, the short-circuit is prevented from being generated in the end parts of the cathode composite mixture layer. Therefore, according to the present invention, can be realized the solid electrolyte battery in which the short-circuit is not generated and the yield upon manufacturing the solid electrolyte battery is improved.

What is claimed is:

1. A solid electrolyte battery comprising a battery element in which a cathode having a cathode composite mixture layer formed by applying a cathode composite mixture on a cathode current collector so as to provide parts to which the cathode composite mixture is not applied at end parts in the longitudinal direction of the cathode current collector and an anode having an anode composite mixture layer formed by applying an anode composite mixture on an anode current collector so as to provide parts to which the anode composite mixture is not applied at end parts in the longitudinal direction of the anode current collector are laminated so as to provide a solid electrolyte layer between the cathode and the anode, wherein porous members made of ceramics or non-woven fabrics are arranged between the longitudinal end parts of the cathode composite mixture layer and the longitudinal end parts of the anode composite mixture layer to extend to the parts of the cathode current collector to which the cathode composite mixture is not applied.

2. The solid electrolyte battery according to claim 1, wherein the battery element is a coiling type battery element in which the cathode and the anode are longitudinally coiled through the solid electrolyte layer and the major axis of the coiling type battery element is A, the breadth of the porous member made of the ceramics or the non-woven fabric is in the range from 1/10 times as wide as A to A.

3. The solid electrolyte battery according to claim 1, wherein the battery element is a zigzag bending type battery element in which the cathode and the anode are longitudinally bent in a zigzag manner through the solid electrolyte layer, and wherein the bent width of the zigzag bending type battery element is B, the breadth of the porous member or the non-woven fabric is in the range from 1/10 times as wide as B to B.

4. The solid electrolyte battery according to claim 1, wherein the thickness of the porous member made of the ceramics or the non-woven fabric is 0.01 mm or larger and 0.05 mm or smaller.

5. The solid electrolyte battery according to claim 1, wherein the porous member made of the ceramics or the non-woven fabric is composed of alumina.

6. The solid electrolyte battery according to claim 1, wherein the solid electrolyte layer is composed of a gel electrolyte.

7. A method for manufacturing a solid electrolyte battery comprising:

a step of applying a cathode composite mixture on a cathode current collector so as to provide parts to which the cathode composite mixture is not applied at end parts in the longitudinal direction of the cathode current collector to manufacture a cathode having a cathode composite mixture layer on the cathode current collector;

a step of forming a first solid electrolyte layer on the cathode composite mixture layer;

a step of manufacturing an anode having an anode composite mixture layer on an anode current collector by applying an anode composite mixture on the anode current collector so as to provide parts to which the anode composite mixture is not applied at end parts in the longitudinal direction of the anode current collector;

a step of forming a second solid electrolyte layer on the anode composite mixture layer;

a step of arranging porous members made of ceramics or non-woven fabrics between the longitudinal end parts of the cathode composite mixture layer and the longitudinal end parts of the anode composite mixture layer so as to extend to the end parts of the cathode current collector to which the cathode composite mixture is not applied; and a step of laminating the cathode having the first solid electrolyte layer formed on the cathode composite mixture layer and the anode having the second solid electrolyte layer formed on the anode composite mixture layer so as to interpose the first solid electrolyte layer and the second solid electrolyte layer therebetween to form a battery element.

8. The method for manufacturing a solid electrolyte battery according to claim 7, further comprising:

a step of longitudinally coiling the battery element to form a coiling type battery element and accommodating the battery element in an outer package vessel.

9. The method for manufacturing a solid electrolyte battery according to claim 8, wherein the major axis of the coiling type battery element is A, the breadth of the porous member made of the ceramics or the non-woven fabric is in the range from 1/10 times as wide as A to A.

10. The method for manufacturing a solid electrolyte battery according to claim 7, further comprising:

a step of longitudinally bending the battery element in a zigzag manner to have a zigzag bending type battery element and accommodating the battery element in an outer package vessel.

11. The method for manufacturing a solid electrolyte battery according to claim 10, wherein the bent width of the zigzag bending type battery element is B, the breadth of the porous member made of the ceramics or the non-woven fabric is in the range from 1/10 times as wide as B to B.

12. The method for manufacturing a solid electrolyte battery according to claim 7, wherein the thickness of the porous member made of the ceramics or the non-woven fabric is 0.01 mm or larger and 0.05 mm or smaller.

13. The method for manufacturing a solid electrolyte battery according to claim 7, wherein the porous member made of the ceramics or the non-woven fabric employs a porous member made of alumina or a non-woven fabric.

14. The method for manufacturing a solid electrolyte battery according to claim 7, wherein the first solid electrolyte layer and the second electrolyte layer are composed of a gel electrolyte.

* * * * *